(12) United States Patent
Geckler et al.

(10) Patent No.: US 9,726,122 B2
(45) Date of Patent: Aug. 8, 2017

(54) EGR CYLINDER OPERATION IN AN INTERNAL COMBUSTION ENGINE

(71) Applicant: Cummins Inc., Columbus, IN (US)

(72) Inventors: Samuel C. Geckler, Columbus, IN (US); Anthony Kyle Perfetto, Columbus, IN (US)

(73) Assignee: Cummins Inc., Columbus, IN (US)

( * ) Notice: Subject to any disclaimer, the term of this patent is extended or adjusted under 35 U.S.C. 154(b) by 256 days.

(21) Appl. No.: 14/100,561

(22) Filed: Dec. 9, 2013

(65) Prior Publication Data
US 2015/0159588 A1    Jun. 11, 2015

(51) Int. Cl.
*F02M 25/07* (2006.01)
*F02M 26/43* (2016.01)
*F02D 13/02* (2006.01)
*F02D 15/00* (2006.01)
*F02D 41/00* (2006.01)
(Continued)

(52) U.S. Cl.
CPC ......... *F02M 26/43* (2016.02); *F02D 13/0234* (2013.01); *F02D 13/0265* (2013.01); *F02D 13/0269* (2013.01); *F02D 15/00* (2013.01); *F02D 41/008* (2013.01); *F02D 41/0065* (2013.01); *F02M 26/01* (2016.02); *F02D 13/0207* (2013.01); *F02D 2041/001* (2013.01); *F02D 2700/03* (2013.01);
(Continued)

(58) Field of Classification Search
CPC ........... F02M 25/0749; F02M 25/0704; F02M 25/0705; F02M 25/0706; F02M 25/0709; F02M 25/071; F02M 25/0711; F02M 25/0712; F02M 25/072; F02M 25/0722; F02M 25/0724; F02M 25/0739; F02M 25/0748; F02M 26/02; F02M 26/03; F02M 26/04; F02M 26/05; F02M 26/06; F02M 26/07; F02M 26/08; F02M 26/09; F02M 26/10; F02M 26/17; F02M 26/19; F02M 26/21; F02M 26/34; F02M 26/42; F02M 26/43
USPC .................................................. 123/568.18
See application file for complete search history.

(56) References Cited

U.S. PATENT DOCUMENTS 3,941,113 A    3/1976   Baguelin
5,357,936 A    10/1994  Hitomi et al.
(Continued)

FOREIGN PATENT DOCUMENTS

FR    2252762    6/1975
FR    2914366    3/2008
(Continued)

OTHER PUBLICATIONS

European Search Report, EP Appln. No. 14195520, Mar. 18, 2015, 7 pgs.
(Continued)

*Primary Examiner* — Sizo Vilakazi
*Assistant Examiner* — Kevin R Steckbauer
(74) *Attorney, Agent, or Firm* — Taft Stettinius & Hollister LLP

(57) ABSTRACT

A system includes an internal combustion engine having a number of cylinders. At least one of the cylinders is a primary EGR cylinder that solely provides EGR flow during at least some operating conditions. Operation of the primary EGR cylinder is controlled separately from the other cylinders to reduce internal residuals in the primary EGR cylinder.

21 Claims, 3 Drawing Sheets

(51) Int. Cl.
*F02M 26/01* (2016.01)
*F02M 26/05* (2016.01)
*F02M 26/25* (2016.01)

(52) U.S. Cl.
CPC ............. *F02M 26/05* (2016.02); *F02M 26/25* (2016.02); *Y02T 10/142* (2013.01); *Y02T 10/47* (2013.01)

(56) References Cited

U.S. PATENT DOCUMENTS

| | | | | |
|---|---|---|---|---|
| 6,230,683 | B1* | 5/2001 | zur Loye | F02B 1/12 123/27 GE |
| 6,273,076 | B1* | 8/2001 | Beck | F02B 29/0418 123/562 |
| 6,286,482 | B1* | 9/2001 | Flynn | F02B 1/12 123/25 C |
| 6,739,295 | B1* | 5/2004 | Yamaoka | F02B 11/00 123/406.41 |
| 6,871,642 | B1* | 3/2005 | Osterwald | F02B 37/025 123/559.1 |
| 6,877,492 | B1* | 4/2005 | Osterwald | F02B 29/0437 123/568.11 |
| 6,915,776 | B2* | 7/2005 | zur Loye | F02B 1/12 123/304 |
| 7,240,480 | B1 | 7/2007 | Brevick | |
| 8,210,141 | B2* | 7/2012 | Nakamura | F01L 1/3442 123/347 |
| 8,291,891 | B2* | 10/2012 | Alger, II | F02D 13/0238 123/315 |
| 8,561,599 | B2* | 10/2013 | Gingrich | F02M 26/43 123/568.17 |
| 8,944,034 | B2* | 2/2015 | Gingrich | F02B 27/0215 123/315 |
| 9,032,940 | B2* | 5/2015 | Dane | F02D 41/0065 123/568.11 |
| 2004/0103860 | A1* | 6/2004 | zur Loye | F02B 1/12 123/27 R |
| 2009/0308070 | A1 | 12/2009 | Alger, II et al. | |
| 2012/0048244 | A1 | 3/2012 | Hayman et al. | |
| 2012/0204844 | A1* | 8/2012 | Gingrich | F02B 27/0215 123/568.11 |
| 2012/0204845 | A1* | 8/2012 | Gingrich | F02M 26/43 123/568.17 |
| 2012/0260894 | A1 | 10/2012 | Hayman | |
| 2012/0260895 | A1 | 10/2012 | Hayman et al. | |
| 2012/0260897 | A1 | 10/2012 | Hayman et al. | |
| 2012/0285163 | A1 | 11/2012 | Hayman et al. | |
| 2012/0285426 | A1 | 11/2012 | Hayman et al. | |
| 2012/0285427 | A1 | 11/2012 | Hayman et al. | |
| 2013/0213349 | A1* | 8/2013 | Sellnau | F02B 23/101 123/295 |
| 2014/0014075 | A1* | 1/2014 | Yager | F02D 41/0047 123/568.11 |
| 2014/0238363 | A1* | 8/2014 | Keating | F02M 25/077 123/568.17 |
| 2015/0013651 | A1* | 1/2015 | Hayman | F02M 26/21 123/568.11 |
| 2015/0354477 | A1* | 12/2015 | Leone | F02D 37/02 123/406.26 |
| 2015/0361927 | A1* | 12/2015 | Glugla | F02M 25/0749 60/603 |
| 2016/0003134 | A1* | 1/2016 | Hodebourg | F02B 37/183 123/559.1 |
| 2016/0010576 | A1* | 1/2016 | Primus | F02D 41/0052 701/104 |
| 2016/0017847 | A1* | 1/2016 | Hilditch | F02D 41/0052 123/406.48 |
| 2016/0040589 | A1* | 2/2016 | Glugla | F02D 41/0082 60/278 |
| 2016/0040607 | A1* | 2/2016 | Ku | F02D 41/0065 123/568.17 |
| 2016/0108862 | A1* | 4/2016 | Siuchta | F02D 19/024 123/568.12 |

FOREIGN PATENT DOCUMENTS

| | | |
|---|---|---|
| GB | 2458968 | 10/2009 |
| GB | 2473481 | 3/2011 |
| WO | 2009019578 | 2/2009 |
| WO | 2014011371 | 1/2014 |

OTHER PUBLICATIONS

European Search Report and Written Opinion, EP Application No. 14195520.3, Oct. 31, 2016, 6 pgs.

* cited by examiner

EGR CYLINDER OPERATION IN AN INTERNAL COMBUSTION ENGINE

BACKGROUND

Internal combustion engines are known that include a plurality of cylinders with at least one of the plurality of cylinders being dedicated to exclusively providing exhaust gas recirculation to the intake manifold. Also referred to as dedicated EGR engines, such configurations can be used with fuels of all types, including natural gas, gasoline, and diesel fuel.

Spark-ignition engines typically operate by introducing a stoichiometric mixture of air and fuel into a cylinder of the engine. A piston then compresses this mixture, and at a predetermined crankshaft angle, a spark plug will ignite the air/fuel mixture producing a flame front that propagates through the combustion chamber. The rapid increase in heat from the burned fuel triggers an increase in pressure which forces the piston downward in the cylinder. The exhaust gases from the combustion event are expelled from the cylinder through the exhaust valve into an exhaust manifold.

Dedicated EGR engines have a split exhaust manifold in which the exhaust from the dedicated EGR cylinder is divided from the exhaust of the other cylinders. Under operating conditions that produce high exhaust pressures in the EGR manifold, internal residuals of the exhaust can remain in the dedicated EGR cylinder, and in some cases can be pushed back through the cylinder to the intake manifold, which increases the potential for knock occurrence and combustion instability.

Dedicated EGR engines can enjoy greatly simplified controls and pressure management, fewer hardware devices, and other benefits. However, these simplifications come at the cost of a loss of control over the system, including a loss of control due to the different conditions that may be present in the EGR cylinder(s) compared to the other cylinders. Therefore, operating the dedicated EGR cylinder(s) in the same manner as the other cylinders may not result in the desired outputs. As a result further technological developments are desirable in this area.

SUMMARY

One embodiment is a unique system for controlling operations of a divided exhaust engine to reduce or prevent knock and improve combustion stability. Other embodiments include unique methods, systems, and apparatus to control primary EGR cylinder operation in a divided exhaust engine. A primary EGR cylinder is a cylinder whose entire exhaust output, under at least some operating conditions, is recirculated to the intake. Under certain operating conditions, such as those associated with high exhaust pressures, internal residuals in primary EGR cylinder(s) can increase more than the other cylinders, resulting in early knocking and less stability in the primary EGR cylinders. In one specific embodiment, the primary EGR cylinder(s) and the non-primary EGR cylinders operate at fixed cam timing differences relative to one another so that internal exhaust gas residuals are reduced in the primary EGR cylinder(s). In another specific embodiment, the primary EGR cylinder(s) operate at different compression ratios relative to the other cylinders r so that less volume is available at top dead center of the primary EGR cylinder(s) for storage of exhaust gases. The reduction in internal residuals in the primary EGR cylinder(s) reduces the knock propensity of the primary EGR cylinders at certain operating conditions, such as at high exhaust pressures.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
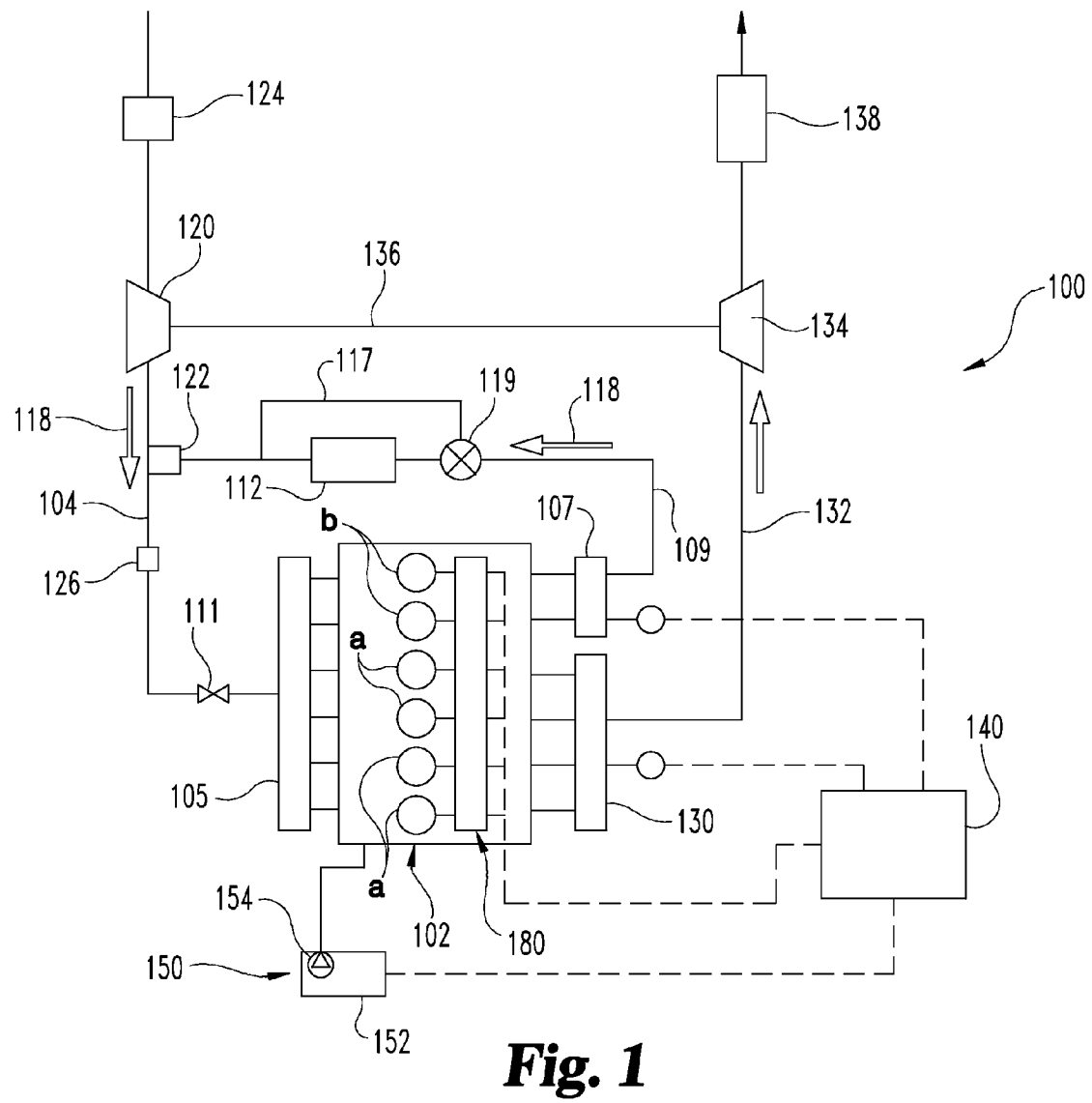
FIG. 1 is a schematic depiction of one embodiment of a system having an engine with a divided exhaust system.
Figure 2:
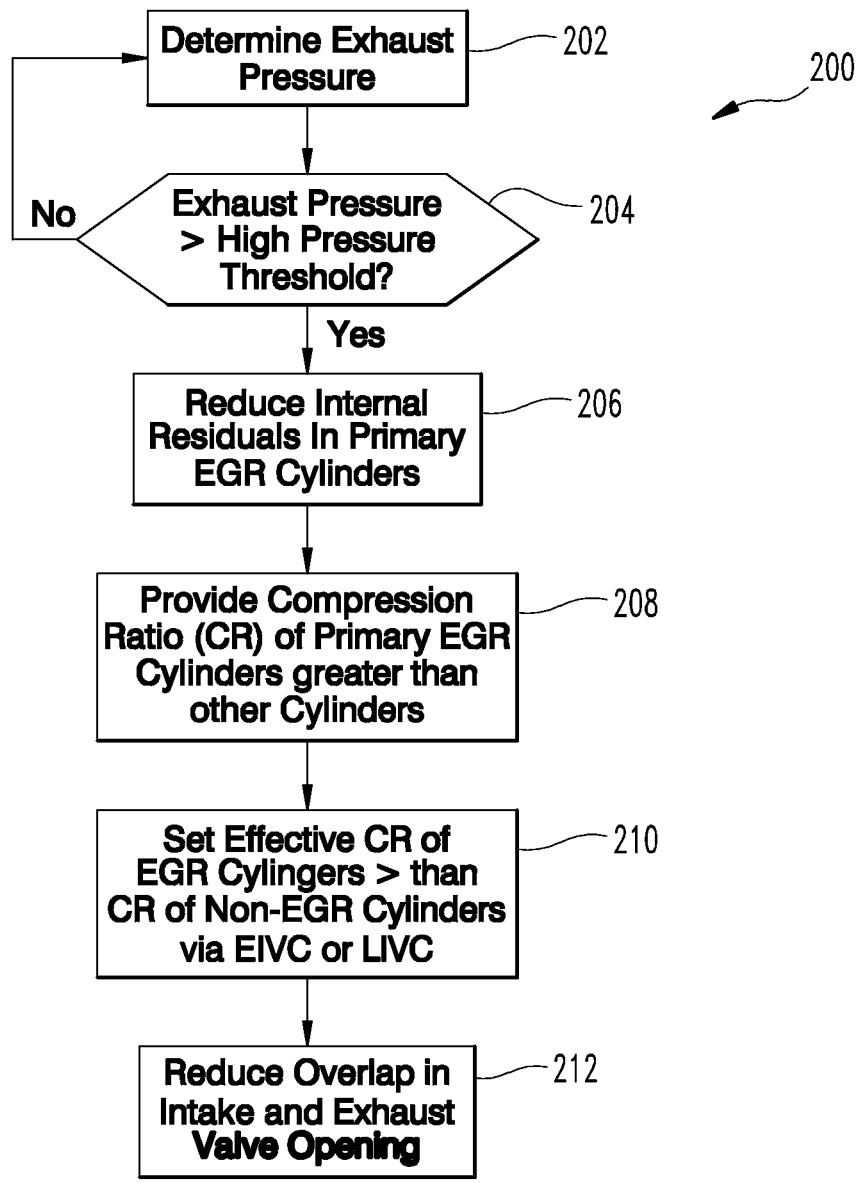
FIG. 2 is a flow diagram of a procedure for operating the engine with the divided exhaust system of FIG. 1.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 is depicted having an engine 102. The engine 102 is an internal combustion engine of any type, and can include a stoichiometric engine, a gasoline engine, a diesel engine, and/or a natural gas engine. In certain embodiments, the engine 102 includes a lean combustion engine such as a lean burn gasoline or natural gas engine. In certain embodiments, the engine 102 may be any engine type producing emissions that may include an exhaust gas recirculation (EGR) system, for example to reduce $NO_x$ emissions from the engine 102. The engine 102 includes a number of cylinders a, b. The number of cylinders may be any number suitable for an engine, and the arrangement may be any arrangement suitable arrangement. The system 100 includes an inline 6 cylinder arrangement for illustration only The example engine 102 may further include an ignition source such as spark plug (not shown) in certain embodiments.

In certain embodiments, the engine 102 is provided as a spark-ignition internal combustion engine, configured to develop mechanical power from internal combustion of a stoichiometric mixture of fuel and induction gas. As used herein, the phrase "induction gas" may include fresh air, recirculated exhaust gases, or the like, or any combination thereof. The intake manifold 105 receives induction gas from the intake passage 104 and distributes the induction gas to combustion chambers of cylinders a, b of the engine 102. Accordingly, an inlet of the intake manifold 105 is disposed downstream of an outlet of the intake passage 104, and an outlet of the intake manifold 105 is disposed upstream of an inlet of each of the combustion chambers in engine 102. A first exhaust manifold 130 collects exhaust gases from combustion chambers of cylinders a of the engine 10 and conveys the exhaust gases to the exhaust passage 132, and a second exhaust manifold 107 collects exhaust gases from combustion chambers of cylinders b of the engine 102 and conveys the exhaust gases to EGR passage 109. Accordingly, inlets of the exhaust manifolds 107, 130 are disposed downstream of an outlet of each of the combustion chambers in engine 102, and upstream of inlets to the respective EGR passage 109 and exhaust passage 132.

Injectors may also be arranged within the engine 102 to deliver fuel directly or indirectly into the combustion chamber of cylinders a, b with a fuel delivery system 150 structured to deliver fuel to the engine 102. The fuel delivery system 150 can include, for example a fuel tank 152 and fuel pump 154 that is configured to deliver a fuel such as gasoline to the engine 102. In another embodiment, the fuel delivery system can be configured to deliver another type of fuel, in addition to gasoline, to the engine 102. Examples of such additional fuels include diesel (or other high cetane fuels), natural gas, ethanol, and the like. In one embodiment, the fuel delivery system 150 may include one or more injectors 158 (FIGS. 3A-3D) configured to inject fuel into the engine 102 so the fuel may be combusted within a combustion chamber of the respective cylinder a, b. Example injectors include direct injectors as shown and/or port injectors.

In the illustrated embodiment, engine 102 includes primary EGR cylinders b, and other or remaining cylinders a that are non-primary EGR cylinders b. Cylinders a can be completely flow isolated from the EGR system or connected to provide at least some exhaust flow to the EGR system and/or to receive at least some exhaust flow from the EGR system under certain operating conditions. The term primary EGR, as utilized herein, should be read broadly. Any EGR arrangement wherein, during at least certain operating conditions, the entire exhaust output of the cylinder is recirculated to the engine intake is a primary EGR cylinder. A primary EGR cylinder typically, at least during primary EGR operation, includes exhaust divided from one or more of the remaining cylinders that are not primary EGR cylinders.

In the system 100, the EGR flow 108 recirculates in EGR passage 109 and combines with intake flow 118 at a position upstream of intake manifold 105. Intake manifold 105 provides a charge flow including the intake flow 118 combined with EGR flow 108. Intake manifold 105 is connected to intake passage 104 that includes an intake throttle 111 to regulate the charge flow to cylinders a, b. Intake passage 104 may also include a charge air cooler 126 to cool the charge flow provided to intake manifold 105. Intake passage 104 also includes a compressor 120 to compress the intake air flow received from an intake air cleaner 124. In other embodiments, intake manifold 105 includes first and second portions divided relative to primary EGR cylinders b and non-primary EGR cylinders a.

The EGR flow 108 may combine with the intake flow 118 at an outlet of a restriction 122 in EGR passage 109 through, for example, a mixer, an accumulator, or by any other arrangement. In certain embodiments, the EGR flow 108 returns to the intake manifold 105 directly. In other embodiments, the EGR system may be a low-pressure loop, for example returning to the intake at a position upstream of a compressor 120. In the illustrated embodiment, the EGR system forms a high-pressure loop, for example, by returning to the intake at a position downstream of compressor 120 and/or at the intake manifold 105. In certain embodiments, the system 100 does not include a compressor or any other type of boost pressure generating device. The example system 100 includes an EGR cooler 112 in the EGR passage 109. In other embodiments, EGR passage 109 can include a bypass 117 with a valve 119 that selectively allows EGR flow to bypass the EGR cooler 112. The presence of an EGR cooler 112 and/or an EGR cooler bypass 117 is optional and non-limiting.

Non-primary EGR cylinder(s) a are connected to an exhaust system that includes exhaust manifold 130 that receives exhaust gases from non-primary EGR cylinders a, exhaust passage 132 that receives exhaust gas from exhaust manifold 130, and a turbine 134 in exhaust passage 132 that is operable via the exhaust gases to drive compressor 120 via a rod, shaft or the like 136. Turbine 134 can be a variable geometry turbine with an adjustable inlet, or include a wastegate to bypass exhaust flow. It will be appreciated, however, that the turbocharger may be provided in any other suitable manner (e.g., as a multi-stage turbocharger, or the like), and may be provided with or without a wastegate and/or bypass. Other embodiments contemplate an exhaust throttle (not shown) in the exhaust system.

The exhaust passage 132 can further include an aftertreatment system 138 in exhaust passage 132 that is configured to treat emissions in the exhaust gas. Aftertreatment system 138 can include any aftertreatment components known in the art. Example aftertreatment components treat carbon monoxide (CO), unburned hydrocarbons (HC), nitrogen oxides ($NO_x$), volatile organic compounds (VOC), and/or particulate matter (PM).

System 100 further includes a variable valve actuation mechanism 180 connected to the intake and/or exhaust valves of cylinders a, b of engine 102. Variable valve actuation mechanism 180 is connected to and operable by control commands from a controller 140 in response to operating conditions. Variable valve actuation mechanism 180 is connected to the intake valves and/or exhaust valves of cylinders a, b to control the lift timing, profile and/or duration of the intake and/or exhaust valves. In one embodiment, variable valve actuation mechanism 180 operates primary EGR cylinder(s) b at a fixed cam timing difference with non-primary EGR cylinders a to reduce or prevent internal residuals in primary EGR cylinder(s) b. Variable valve actuation mechanism 180 may be of any type, and may include, without limitation, closing the intake valve early or late in the intake stroke of primary EGR cylinder(s) b only to, for example, reducing the fluid mass and effective compression ratio in the cylinder, and/or closing an exhaust valve early and opening an intake valve late relative to the exhaust and intake strokes, respectively, to prevent overlap in the valve opening events of the primary EGR cylinder(s) b only.

In certain embodiments, the system 100 includes a controller 140 structured to perform certain operations to control a primary EGR engine to reduce internal residuals in primary EGR cylinder(s) b. In certain embodiments, the controller 140 forms a portion of a processing subsystem including one or more computing devices having memory, processing, and communication hardware. The controller 140 may be a single device or a distributed device, and the functions of the controller 140 may be performed by hardware or software. The controller 140 may be included within, partially included within, or completely separated from an engine controller (not shown). The controller 140 is in communication with any sensor or actuator throughout the system 100, including through direct communication, communication over a datalink, and/or through communication with other controllers or portions of the processing subsystem that provide sensor and/or actuator information to the controller 140. In the illustrated embodiment, controller 140 is connected to fuel system 150, variable valve actuation mechanism 180, EGR manifold pressure sensor 142, and exhaust manifold pressure sensor 144, as discussed further below.

Example parameters related to the operation of the engine 102 include any parameters that affect or can be correlated to the intake and exhaust valve opening/closing timing and compression ratios of cylinders a, b. Further example and non-limiting parameters related to the operation of the engine 10 include an induction gas temperature at the intake passage 104, an induction gas temperature at the intake manifold 105, an induction gas pressure at the intake manifold 105, an exhaust gas temperature at the exhaust manifold 130, an exhaust gas pressure at the exhaust manifold 130, an exhaust gas temperature at the inlet and/or outlet of the exhaust passage 132, an exhaust gas pressure at the inlet and/or outlet of the exhaust passage 132, an exhaust gas temperature at the inlet and/or outlet of the EGR passage 109, an exhaust gas pressure at the inlet and/or outlet of the EGR passage 109, a lift, duration and/or timing of an intake valve and/or an exhaust valve of cylinders a, b, a rate of fuel injection, a type of fuel injected, a speed of compressor 120, a geometry or position of the turbine 134, a composition of induction gas and/or EGR gas, an engine speed value, an engine load, engine torque, engine power output value, and/or combinations thereof. Additionally or alternatively, an example parameter includes a rate of change or other transformation of any described parameter. The illustrative parameters are example and non-limiting.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

In certain embodiments, the controller 140 provides an engine control command, and one or more components of the engine control system 100 are responsive to the engine control command. The engine control command, in certain embodiments, includes one or more messages, and/or includes one or more parameters structured to provide instructions to the various engine components responsive to the engine control command. An engine component responding to the engine control command may follow the command, receive the command as a competing instruction with other command inputs, utilize the command as a target value or a limit value, and/or progress in a controlled manner toward a response consistent with the engine control command.

Certain systems are described following, and include examples of controller operations in various contexts of the present disclosure. In certain embodiments, a procedure 200 is provided that reduces the internal exhaust gas residuals in primary EGR cylinder(s) b during high exhaust pressure operating conditions. Under high pressure conditions of EGR manifold 107, exhaust gases from primary EGR cylinder(s) b may be trapped in the primary EGR cylinder(s) b after closing of the exhaust valve. Exhaust gases may also be pushed back into the intake manifold 105. These conditions decrease the combustion stability of the primary EGR cylinder(s) b and increase the likelihood or propensity for knock to occur.

In one embodiment, procedure 200 includes performing an operation to interpret or determine exhaust pressure of one or both of EGR manifold 107 and exhaust manifold 130. Procedure 200 further includes a conditional 204 to determine that the exhaust pressure in EGR manifold 107 is greater than a predetermined high pressure threshold. Alternatively, a high pressure condition could be indicated by the pressure differential between the EGR manifold 107 and intake manifold 105 being less than a threshold amount. If conditional 204 is negative, procedure 200 returns to operation 202 to determine exhaust pressure conditions. If conditional 204 is positive, procedure 200 continues at operation 206 to reduce internal residuals for the primary EGR cylinders b under high pressure exhaust conditions. In still other embodiments, procedure 200 does not determine a pressure threshold is exceeded or that a pressure differential threshold is not satisfied, but similarly operates primary EGR cylinder(s) b under all operating conditions in a manner that will reduce or mitigate internal residuals when high pressure conditions occur, as discussed below.

Various techniques for reducing the internal residuals for primary EGR cylinder(s) b are contemplated. One technique includes an operation 208 to provide a compression ratio (CR) for primary EGR cylinders b that is greater than the compression ratio of non-primary EGR cylinders a. The greater compression ratio in primary EGR cylinder(s) b provides less volume for internal residuals of the exhaust gas to be trapped in primary EGR cylinder(s) b. As a result, under high pressure exhaust conditions in EGR manifold 107, less exhaust gas is trapped in primary EGR cylinder(s) b. In one embodiment, the compression ratios of the primary EGR cylinder(s) b and non-primary EGR cylinders a is a geometric compression ratio. In one specific embodiment, the geometric compression ratio of the primary EGR cylinders b is about 16:1 and the geometric compression ratio of the non-primary EGR cylinders a is about 12:1, although other specific compression ratios are not precluded.

In a further variation, procedure 200 includes an operation 210 to reduce the geometric compression ratio of primary EGR cylinder(s) b by providing an effective compression ratio that is greater than the compression ratio of the non-primary EGR cylinders a. Operation 210 can include providing the effective compression ratio by one of an early intake valve closing (EIVC) operation or a late intake valve closing (LIVC) relative to bottom dead center of the intake stroke of the piston of primary EGR cylinder b.

In an example system and method including internal combustion engine 102 having a number of cylinders a, b, at least one of the cylinders is a primary EGR cylinder b, and the primary EGR cylinder b includes an EGR compression ratio. The system and method further includes cylinders a from the numbers of cylinders that are non-primary EGR cylinders each having an exhaust cylinder compression ratio. In certain embodiments, the EGR compression ratio is distinct from the exhaust cylinder compression ratio. Example and non-limiting systems having an EGR compression ratio distinct from the exhaust cylinder compression ratio include a primary EGR cylinder b having an adjusted bore and/or stroke value, an adjusted valve timing value (e.g. providing a distinct actual or effective compression ratio within the same geometric compression ratio), and/or a piston driving mechanism that provides a different stroke value to the primary EGR cylinder b. Example piston driving mechanisms include, without limitation, a swashplate, a wobble plate, a z-crank shaft, a cam-driven piston, and/or a distinct pivot distance around the crankshaft for the primary EGR cylinder(s) b.

In certain embodiments, the example system further includes a controller 140 that interprets a high pressure exhaust condition likely to result in internal residuals in the primary EGR cylinder(s) b, and in response to the high pressure exhaust condition provides a compression ratio adjustment command. The system further includes a variable compression ratio device operationally coupled to the primary EGR cylinder b and responsive to the compression ratio adjustment command. The variable displacement device may be any type known in the art. In certain embodiments, the piston driving mechanisms are variable displacement devices known to be adjustable in response to a command—for example and without limitation a swash plate angle change, a cam rotation or position change, and/or a wobble plate adjustment, which may be utilized to adjust the primary EGR cylinder(s) compression ratio. Additionally or alternatively, a variable valve timing operation on the primary EGR cylinder(s) b may be utilized with variable valve actuating device 180 to change the effective compression ratio of the primary EGR cylinder(s) b. Accordingly, some control over the amount of internal residuals of primary EGR cylinder(s) b is realized, having the benefit of the disclosures herein, in a system utilizing one or more primary EGR cylinders b.

Figure 3A:
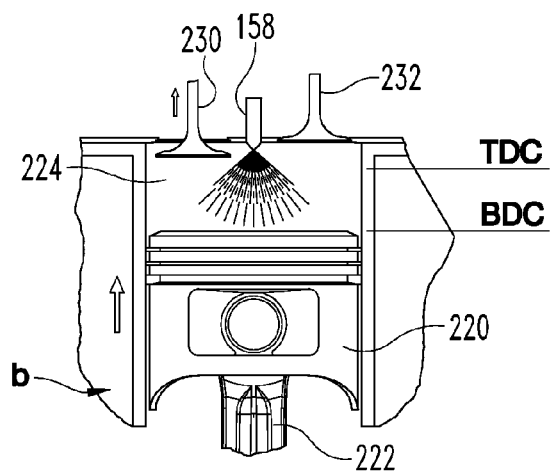
FIGS. 3A-3C are schematic depictions of a primary EGR cylinder of the engine of FIG. 1.
Figure 3B:
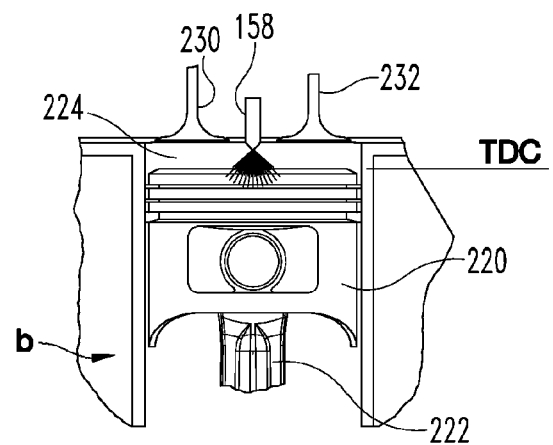
Figure 3C:
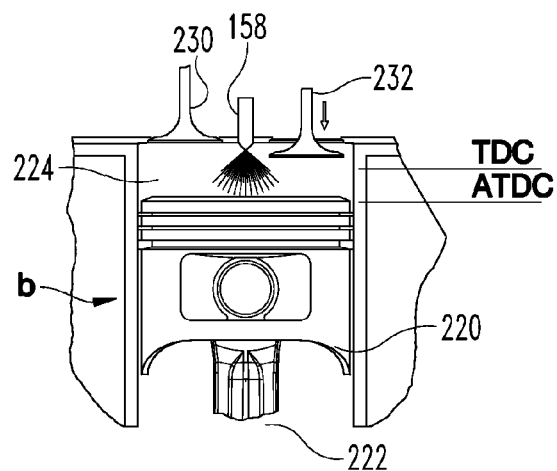
Figure 3D:
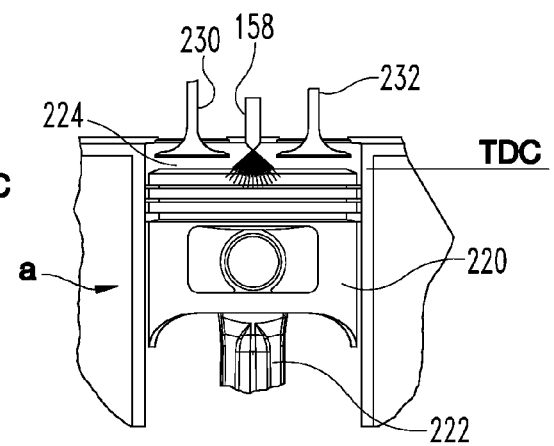
FIG. 3D is a schematic depiction of a non-primary EGR cylinder of the engine of FIG. 1.

Procedure 200 can also include an operation 212 to reduce the overlap in the exhaust valve opening and the intake valve opening of primary EGR cylinder(s) b relative to the overlap in the cylinder a before and after, respective, top dead center of the piston of primary EGR cylinder b during the transition from the exhaust stroke to the intake stroke, via control commands to variable valve actuation mechanism 180. As shown further in FIGS. 3A-3C, primary EGR cylinder b includes a piston 220 connected to a crank 222. Piston 220 moves in combustion chamber 224 between a top dead center (TDC) position and a bottom dead center position (not shown). In FIG. 3A piston 220 is shown at a before TDC (BTDC) position and is moving toward the TDC position, and exhaust valve 230 is at moving to a closed position while intake valve 232 is closed. As shown in FIG. 3B, just before piston 220 reaches the TDC position, exhaust valve 230 and intake valve 232 are both closed. In FIG. 3C as piston 230 moves away from the TDC position toward bottom dead center during the intake stoke, intake valve 232 is opened while exhaust valve 230 is closed. As a result, exhaust gases in EGR exhaust manifold 107 are prevented from being pushed into primary EGR cylinder b and also through primary EGR cylinder b to intake manifold 105. While primary EGR cylinder(s) b operate without overlap in the opening of exhaust valve 230 and intake valve 232, the non-primary EGR cylinders a can be operated with an overlap in the opening of the intake valve 232 and exhaust valve 230 at the TDC position at initiation of the intake stroke, as shown in FIG. 3D.

In another embodiment, primary EGR cylinders b have an overlap in the opening between the exhaust valve 230 and intake valve 232 that is reduced relative to the overlap in the non-primary EGR cylinders a. In one specific embodiment, the overlap in the opening of valves 230, 232 can extend for a crank angle change of up to 20 degrees of positive overlap where both valves are open during a crank angle change of 20 degrees, and up to 20 degrees of negative overlap where both valves are closed during a crank angle change of 20 degrees. For example, at a positive 20 degree overlap, the intake valve 232 opens at 10 degrees BTDC and the exhaust valve 230 closes 10 degrees ATDC. At a negative 20 degree overlap, the exhaust valve 230 closes at 10 degrees BTDC and the intake valve 232 opens 10 degrees ATDC. In another specific embodiment of a positive 20 degree overlap, the intake valve 232 opens at 10 degrees ATDC and the exhaust valve 230 closes at 30 degrees ATDC. Other opening and closing positions relative to TDC are also contemplated.

In one embodiment, primary EGR cylinder b intake valve and exhaust valve overlap open and closed conditions extend from a crank angle change from negative 20 degrees to positive 20 degrees, with the intake valve opening at a crank angle ranging from 10 degrees BTDC to 30 degrees ATDC and exhaust valve closing at a crank angle ranging from 10 degrees BTDC to 30 degrees ATDC. In addition, the crank angle overlap for primary EGR cylinders b is reduced relative to the overlap of the exhaust valve opening and intake valve opening of the non-primary EGR cylinders a, which can operate with simultaneously open exhaust and intake valves over a crank angle change range extending from 0 degrees to 100 degrees.

Various aspects of the systems and methods disclosed herein are contemplated. According to one aspect, a system includes an internal combustion engine having a plurality of cylinders that receive a charge flow from an intake manifold. At least one of the plurality of cylinder is a primary EGR cylinder connected to an EGR exhaust manifold that is flow connected to the intake manifold, and remaining ones of the plurality of cylinders are in flow communication with an exhaust manifold that is flow connected to an exhaust passage that emits exhaust gas from the remaining ones of the plurality of cylinders. The primary EGR cylinder include a first compression ratio, the remaining ones of the plurality of cylinders each comprise a second compression ratio, and the first compression ratio is greater than the second compression ratio.

In one embodiment, the first compression ratio and the second compression ratio are geometric compression ratios. In another embodiment, the at least one primary EGR cylinder includes at least one intake valve that is connected to a variable valve actuation mechanism that is operable to vary an effective compression ratio of the at least one primary EGR cylinder.

In one refinement of these embodiments, the effective compression ratio of the at least one primary EGR cylinder is less than the first compression ratio and greater than the second compression ratio. In another refinement, the variable valve actuation mechanism is operable to provide an early closing of the intake valve relative to an intake stroke of the at least one primary EGR cylinder to reduce the effective compression ratio relative to the first compression ratio. In yet another refinement, the variable valve actuation mechanism is operable to provide a late closing of the intake valve relative to the intake stroke of the at least one primary EGR cylinder to reduce the effective compression ratio relative to the first compression ratio.

According to another aspect, a system includes an internal combustion engine having a plurality of cylinders that receive a charge flow from an intake manifold. At least one of the plurality of cylinders is a primary EGR cylinder that is in flow communication with an EGR exhaust manifold, and the primary EGR cylinder includes at least one intake valve and at least one exhaust valve. The remaining ones of the plurality of cylinders are in flow communication with an exhaust manifold that is flow connected to an exhaust passage that emits exhaust gas from the remaining ones of the plurality of cylinders.

In one embodiment, during operation the at least one exhaust valve of the primary EGR cylinder is configured to close relative to an opening of the at least one intake valve of the primary EGR cylinder at initiation of an intake stroke of a piston of the primary EGR cylinder so that a second overlap in the opening of the at least one exhaust valve and the at least one intake valve is less than the first overlap to reduce backflow of exhaust gases from the EGR manifold to the intake manifold through the at least one primary EGR cylinder.

In another embodiment, during operation the at least one exhaust valve is configured to close before top dead center of a piston of the least one primary EGR cylinder at initiation of an intake stroke of the at least one primary EGR cylinder and the intake valve is configured to open after top dead center of the piston during the intake stroke of the at least one primary EGR cylinder so that the opening of the exhaust valve and the opening of the intake valve do not overlap, preventing backflow of exhaust gases from the EGR manifold to the intake manifold through the at least one primary EGR cylinder.

In one embodiment, the remaining ones of the plurality of cylinders are configured to operate with an overlap in opening of an exhaust valve and an intake valve at initiation of an intake stroke thereof. In a refinement of this embodiment, the at least one primary EGR cylinder includes a first compression ratio and the remaining ones of the plurality of cylinders include a second compression ratio, and the second compression ratio is less than the first compression ratio. In a further refinement, the at least one intake valve of the at least one primary EGR cylinder is connected to a variable valve actuation mechanism that is operable to vary an effective compression ratio of the primary EGR cylinder.

In another refinement, the effective compression ratio of the primary EGR cylinder is less than the first compression ratio and greater than the second compression ratio. In yet another refinement, the variable valve actuation mechanism is operable to provide an early closing of the intake valve of the at least one primary EGR cylinder relative to bottom dead center of the piston during the intake stroke of the at least one primary EGR cylinder to reduce the effective compression ratio relative to the first compression ratio. In a further refinement, the variable valve actuation mechanism is operable to provide a late closing of the intake valve of the at least one primary EGR cylinder relative to bottom dead center of the intake stroke of the at least one primary EGR cylinder to reduce the effective compression ratio relative to the first compression ratio.

According to another aspect, a method includes operating an internal combustion engine having a plurality of cylinders; recirculating exhaust gas from at least one primary EGR cylinder of the plurality of cylinders to an intake of the plurality of cylinders while producing exhaust gas from remaining ones of the plurality of cylinders into an exhaust system including an aftertreatment device; and increasing a compression ratio of the at least one primary EGR cylinder relative to a compression ratio of the remaining ones of the plurality of cylinders to reduce exhaust gas residuals in the at least one primary EGR cylinder in response to a high pressure exhaust condition.

In one embodiment of the method, the compression ratio of the at least one primary EGR cylinder and the remaining ones of other of the plurality of cylinders is a geometric compression ratio. In a refinement of this embodiment, the method includes reducing the geometric compression ratio of the at least one primary EGR cylinder to an effective compression ratio, where the effective compression ratio is greater than the compression ratio of the remaining ones of the plurality of cylinders. In a further refinement, the geometric compression ratio is reduced to the effective compression ratio by one of an early closing of an intake valve and a late closing of the intake valve relative to an intake stroke of the at least one primary EGR cylinder.

According to another aspect, a method includes operating an internal combustion engine having a plurality of cylinders; recirculating exhaust gas from at least one primary EGR cylinder of the plurality of cylinders to an intake of the plurality of cylinders while producing exhaust gas from remaining ones of the plurality of cylinders into an exhaust system having an aftertreatment device, where the at least one primary EGR cylinder includes at least one intake valve and at least one exhaust valve; closing the at least one exhaust valve before top dead center of a piston of the at least one primary EGR cylinder at initiation of an intake stroke of the at least one primary EGR cylinder; and opening the at least one intake valve during the intake stroke of the at least one primary EGR cylinder after top dead center of the piston of the at least one primary EGR cylinder.

In one embodiment of the method, the remaining ones of the plurality of cylinders are operated with an overlap in openings of an exhaust valve and an intake valve at initiation of an intake stroke of a piston thereof. In a refinement, the method includes operating the at least one primary EGR cylinder at a first compression ratio and the remaining ones of the plurality of cylinders at a second compression ratio, the second compression ratio being less than the first compression ratio. In a further refinement, the method includes varying an effective compression ratio of the at least one primary EGR cylinder to an amount between the first compression ratio and the second compression ratio. In yet a further refinement, varying the effective compression ratio of the at least one primary EGR cylinder includes closing the intake valve early relative to bottom dead center of the intake stroke of the piston of the at least one primary EGR cylinder. In another refinement, varying the effective compression ratio of the at least one primary EGR cylinder includes closing the intake valve late relative to bottom dead center of the intake stroke of the piston of the at least one primary EGR cylinder.

In another aspect, a method includes operating an internal combustion engine having a plurality of cylinders; recirculating exhaust gas from at least one primary EGR cylinder of the plurality of cylinders to an intake of the plurality of cylinders while producing exhaust gas from remaining ones of the plurality of cylinders into an exhaust system having an aftertreatment device, where each of the plurality of cylinders includes at least one intake valve and at least one exhaust valve; operating respective ones of the remaining ones of the plurality of cylinders with a first overlap in an opening of the least one exhaust valve thereof and an opening of the intake valve thereof relative to an initiation of an intake stroke of a piston of the respective cylinder; and operating the at least one primary EGR cylinder with a second overlap in an opening of the at least one exhaust valve thereof and an opening of the at least one intake valve thereof relative to an initiation of an intake stroke of a piston of the at least one primary EGR cylinder, where the second overlap is less than the first overlap.

In one embodiment of the method, the second overlap includes the at least one exhaust valve and the at least one intake valve being closed simultaneously during a crank angle change range of up to 20 degrees relative to the initiation of the intake stroke. In another embodiment, the second overlap includes the at least one exhaust valve and the at least one intake valve being open simultaneously during a crank angle change range of no more than 20 degrees relative to the initiation of the intake stroke.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
an internal combustion engine having a plurality of cylinders that receive a charge flow from an intake manifold;
at least one of the plurality of cylinders comprising a primary EGR cylinder connected to an EGR exhaust manifold that is flow connected to the intake manifold;
remaining ones of the plurality of cylinders being in flow communication with an exhaust manifold that is flow connected to an exhaust passage that emits exhaust gas from the remaining ones of the plurality of cylinders;
a controller configured to determine an exhaust pressure condition in the EGR exhaust manifold and, in response to the exhaust pressure condition, dynamically increase a compression ratio of the at least one primary EGR cylinder relative to a compression ratio of the remaining ones of the plurality of cylinders to reduce exhaust gas residuals in the at least one primary EGR cylinder;
wherein the at least one primary EGR cylinder comprises a first compression ratio, the remaining ones of the plurality of cylinders each comprise a second compression ratio, and the first compression ratio is greater than the second compression ratio;
wherein the at least one primary EGR cylinder includes at least one intake valve and at least one exhaust valve that are connected to a variable valve actuation mechanism that is operable to vary an effective compression ratio of the at least one primary EGR cylinder;
wherein the effective compression ratio of the at least one primary EGR cylinder is less than the first compression ratio and greater than the second compression ratio; and
wherein during operation the at least one exhaust valve of the at least one primary EGR cylinder is closed before top dead center of a piston of the at least one primary EGR cylinder at initiation of an intake stroke in the at least one primary EGR cylinder and the at least one intake valve of the at least one primary EGR cylinder is opened after top dead center of the piston during the intake stroke of the at least one primary EGR cylinder so that an overlap in the opening of the exhaust valve and the opening of the intake valve is less than zero crank angle degrees to reduce backflow of exhaust gases from the EGR exhaust manifold to the intake manifold through the at least one primary EGR cylinder while each of the remaining ones of the plurality of cylinders are operated with an overlap in an intake valve opening and an exhaust valve opening at initiation of an intake stroke of the respective remaining ones of the plurality of cylinders.

2. The system of claim 1, wherein the first compression ratio and the second compression ratio are geometric compression ratios.

3. The system of claim 1, wherein the variable valve actuation mechanism is operable to provide an early closing of the intake valve relative to an intake stroke of the at least one primary EGR cylinder to reduce the effective compression ratio relative to the first compression ratio.

4. The system of claim 1, wherein the variable valve actuation mechanism is operable to provide a late closing of the intake valve relative to the intake stroke of the at least one primary EGR cylinder to reduce the effective compression ratio relative to the first compression ratio.

5. The system of claim 1, wherein the at least one exhaust valve of the at least one primary EGR cylinder is closed at least 10 degrees before top dead center of the piston of the at least one primary EGR cylinder at initiation of the intake stroke in the at least one primary EGR cylinder and the at least one intake valve of the primary EGR cylinder is opened at least 1.0 degrees after top dead center of the piston during the intake stroke of the at least one primary EGR cylinder.

6. A system, comprising:
an internal combustion engine having a plurality of cylinders that receive a charge flow from an intake manifold;

at least one of the plurality of cylinders comprising a primary EGR cylinder that is in flow communication with an EGR exhaust manifold, the primary EGR cylinder comprising at least one intake valve and at least one exhaust valve;

remaining ones of the plurality of cylinders being in flow communication with an exhaust manifold that is flow connected to an exhaust passage that emits exhaust gas from the remaining ones of the plurality of cylinders;

a controller configured to determine an exhaust pressure condition in the EGR exhaust manifold and, in response to the exhaust pressure condition, dynamically increase a compression ratio of the at least one primary EGR cylinder relative to a compression ratio of the remaining ones of the plurality of cylinders to reduce exhaust gas residuals in the at least one primary EGR cylinder;

wherein during operation the at least one exhaust valve of the primary EGR cylinder is configured to close relative to an opening of the at least one intake valve of the primary EGR cylinder at initiation of an intake stroke of a piston of the primary EGR cylinder so that a first overlap in the opening of the at least one exhaust valve and the at least one intake valve is less than a second overlap in an open position of an exhaust valve and an open position of an intake valve at initiation of an intake stroke in each of the remaining ones of the plurality of cylinders to reduce backflow of exhaust gases from the EGR manifold to the intake manifold through the primary EGR cylinder; and wherein during operation the at least one exhaust valve of the primary EGR cylinder is configured to close before top dead center of the piston of the primary EGR cylinder at initiation of the intake stroke of the primary EGR cylinder and the at least one intake valve of the primary EGR cylinder is configured to open after top dead center of the piston during the intake stroke of the primary EGR cylinder so that the second overlap in the opening of the exhaust valve and the opening of the intake valve is less than zero crank angle degrees while the remaining ones of the plurality of cylinders are configured to operate with a first overlap in an open position of an exhaust valve of a respective cylinder with an open position of an intake valve of the respective cylinder at initiation of an intake stroke of the respective cylinder.

7. The system of claim 6, wherein a crank angle change of the piston of up to 20 degrees occurs from the closing of the at least one exhaust valve to the opening of the at least one intake valve during the second overlap.

8. The system of claim 6, wherein during operation the at least one exhaust valve of the primary EGR cylinder is configured to close at least 10 degrees before top dead center of the piston of the primary EGR cylinder at initiation of the intake stroke of the primary EGR cylinder and the at least one intake valve of the primary EGR cylinder is configured to open at least 10 degrees after top dead center of the piston during the intake stroke of the at least one primary EGR cylinder.

9. A system, comprising:

an internal combustion engine having a plurality of cylinders that receive a charge flow from an intake manifold;

at least one of the plurality of cylinders comprising a primary EGR cylinder that is in flow communication with an EGR exhaust manifold, the primary EGR cylinder comprising at least one intake valve and at least one exhaust valve;

remaining ones of the plurality of cylinders being in flow communication with an exhaust manifold that is flow connected to an exhaust passage that emits exhaust gas from the remaining ones of the plurality of cylinders, wherein the remaining ones of the plurality of cylinders are configured to operate with a first overlap in an open position of an exhaust valve of a respective cylinder with an open position of an intake valve of the respective cylinder at initiation of an intake stroke of the respective cylinder;

a controller configured to determine an exhaust pressure condition in the EGR exhaust manifold and, in response to the exhaust pressure condition, dynamically increase a compression ratio of the at least one primary EGR cylinder relative to a compression ratio of the remaining ones of the plurality of cylinders to reduce exhaust gas residuals in the at least one primary EGR cylinder, wherein during operation the at least one exhaust valve of the primary EGR cylinder is configured to close before top dead center of a piston of the primary EGR cylinder relative to an opening of the at least one intake valve of the primary EGR cylinder after top dead center of the piston of the primary EGR cylinder at initiation of an intake stroke so that a second overlap in the opening of the at least one exhaust valve and the at least one intake valve is less than the zero crank angle degrees to reduce backflow of exhaust gases from the EGR exhaust manifold to the intake manifold through the at least one primary EGR cylinder, while each of the remaining ones of the plurality of cylinders are operated with the first overlap in the open position of the exhaust valve and the open position of the intake valve at initiation of the intake stroke thereof;

wherein the primary EGR cylinder includes a first compression ratio and the remaining ones of the plurality of cylinders include a second compression ratio, the second compression ratio being less than the first compression ratio, wherein the at least one intake valve of the primary EGR cylinder is connected to a variable valve actuation mechanism that is operable to vary an effective compression ratio of the primary EGR cylinder; and wherein the effective compression ratio of the primary FOR cylinder is less than the first compression ratio and greater than the second, compression ratio.

10. The system of claim 9, wherein the variable valve actuation mechanism is operable to provide an early closing of the intake valve of the primary EGR cylinder relative to bottom dead center of the piston during the intake stroke of the primary EGR cylinder to reduce the effective compression ratio relative to the first compression ratio.

11. The system of claim 9, wherein the variable valve actuation mechanism is operable to provide a late closing of the intake valve of the primary EGR cylinder relative to bottom dead center of the intake stroke of the primary FUR cylinder to reduce the effective compression ratio relative to the first compression ratio.

12. The system of claim 9, wherein during operation the at least one exhaust valve of the primary EGR cylinder is configured to close at least 10 degrees before top dead center of the piston of the primary EGR cylinder relative to the opening of the at least one intake valve of the primary EGR cylinder at least 10 degrees after top dead center.

13. A method, comprising:
operating an internal combustion engine having a plurality of cylinders;
recirculating exhaust gas from at least one primary FOR cylinder of the plurality of cylinders to an intake of the plurality of cylinders while producing exhaust gas from remaining ones of the plurality of cylinders into an exhaust system including an aftertreatment device;
determining an exhaust pressure condition in an exhaust manifold of the at least one primary EGR cylinder;
in response to the exhaust pressure condition, dynamically increasing a compression ratio of the at least one primary EGR cylinder relative to a compression ratio of the remaining ones of the plurality of cylinders to reduce exhaust gas residuals in the at least one primary EGR cylinder;
reducing the compression ratio of the at least one primary EGR cylinder to an effective compression ratio, wherein the effective compression ratio is greater than the compression ratio of the remaining ones of the plurality of cylinders; and
closing at least one exhaust valve of the at least one primary EGR cylinder before top dead center of a piston of the at least one primary EGR cylinder at initiation of an intake stroke of the at least one primary EGR cylinder and opening at least one intake valve of the primary EGR cylinder after top dead center of the piston during the intake stroke of the at least one primary EGR cylinder so that a first overlap in the opening of the exhaust valve and the opening of the intake valve is less than zero crank angle degrees to reduce backflow of exhaust gases through the at least one primary EGR cylinder while each of the remaining ones of the plurality of cylinders are operated with a second overlap in an open position of an exhaust valve of a respective cylinder with an open position of an intake valve of the respective cylinder at initiation of an intake stroke of the respective cylinder.

14. The method of claim 13, wherein the compression ratio of the at least one primary EGR cylinder and the remaining ones of other of the plurality of cylinders is a geometric compression ratio.

15. The method of claim 13, wherein the compression ratio of the at least one primary EGR cylinder is reduced to the effective compression ratio by one of an early closing of an intake valve and a late closing of the intake valve relative to an intake stroke of the at least one primary EGR cylinder.

16. The method of claim 13, wherein closing the at least one exhaust valve of the at least one primary EGR cylinder includes closing the at least one exhaust valve at least 10 degrees before top dead center of the piston of the at least one primary EGR cylinder at initiation of the intake stroke of the at least one primary EGR cylinder and opening the at least one intake valve of the primary EGR cylinder includes opening the at least one intake valve at least 10 degrees after top dead center of the piston during the intake stroke of the at least one primary EGR cylinder.

17. A method, comprising:
operating an internal combustion engine having a plurality of cylinders;
recirculating exhaust gas from at least one primary EGR cylinder of the plurality of cylinders to an intake of the plurality of cylinders while producing exhaust gas from remaining ones of the plurality of cylinders into an exhaust system having an aftertreatment device, wherein each of the plurality of cylinders includes at least one intake valve and at least one exhaust valve;
determining an exhaust pressure condition in an exhaust manifold of the at least one primary EGR cylinder;
in response to the exhaust pressure condition, dynamically increasing a compression ratio of the at least one primary EGR cylinder relative to a compression ratio of the remaining ones of the plurality of cylinders to reduce exhaust gas residuals in the at least one primary EGR cylinder;
operating respective ones of the remaining ones of the plurality of cylinders with a first overlap in an opening of the least one exhaust valve thereof and an opening of the intake valve thereof relative to an initiation of an intake stroke of a piston of the respective cylinder; and
operating the at least one primary EGR cylinder with a second overlap in an opening of the at least one exhaust valve thereof and an opening of the at least one intake valve thereof relative to an initiation of an intake stroke of a piston of the at least one primary EGR cylinder, wherein the second overlap is less than the first overlap and each of the remaining ones of the plurality of cylinders are operated with the first overlap while the at least one primary FOR cylinder is operated with the second overlap; and
wherein the second overlap includes the at least one exhaust valve and the at least one intake valve being closed simultaneously during a crank angle change range of less than zero and up to negative 20 degrees relative to the initiation of the intake stroke.

18. The method of claim 17, further comprising operating the at least one primary EGR cylinder at a first compression ratio and the remaining ones of the plurality of cylinders at a second compression ratio, the second compression ratio being less than the first compression ratio; and
varying an effective compression ratio of the at least one primary EGR cylinder to an amount between the first compression ratio and the second compression ratio.

19. The method of claim 18, wherein varying the effective compression ratio of the at least one primary EGR cylinder includes closing the at least one intake valve early relative to bottom dead center of the intake stroke of the piston of the at least one primary EGR cylinder.

20. The method of claim 18, wherein varying the effective compression ratio of the at least one primary EGR cylinder includes closing the at least one intake valve late relative to bottom dead center of the intake stroke of the piston of the at least one primary EGR cylinder.

21. The method of claim 17, wherein the second overlap includes the at least one exhaust valve opening at least 10 degree before top dead center of the piston at initiation of the intake stroke and the at least one intake valve opening at least 10 degrees after top dead center of the piston during the intake stroke.

* * * * *